US009606937B1

(12) United States Patent
Marathe et al.

(10) Patent No.: US 9,606,937 B1
(45) Date of Patent: Mar. 28, 2017

(54) CACHE INSERTION BASED ON THRESHOLD ACCESS FREQUENCY

(71) Applicant: Veritas Technologies LLC, Mountain View, CA (US)

(72) Inventors: Shailesh Marathe, Maharashtra (IN); Sumit Dighe, Maharashtra (IN); Niranjan Pendharkar, Maharashtra (IN); Anindya Banerjee, Assam (IN); Shirish Vijayvargiya, Assam (IN)

(73) Assignee: Veritas Technologies LLC, Mountain View, CA (US)

( * ) Notice: Subject to any disclaimer, the term of this patent is extended or adjusted under 35 U.S.C. 154(b) by 386 days.

(21) Appl. No.: 14/193,549

(22) Filed: Feb. 28, 2014

(51) Int. Cl.
*G06F 12/00* (2006.01)
*G06F 12/122* (2016.01)
*G06F 9/50* (2006.01)
*G06F 12/0806* (2016.01)
*G06F 12/0831* (2016.01)

(52) U.S. Cl.
CPC .......... *G06F 12/122* (2013.01); *G06F 9/5016* (2013.01); *G06F 12/0806* (2013.01); *G06F 12/0833* (2013.01); *G06F 2212/283* (2013.01); *G06F 2212/62* (2013.01)

(58) Field of Classification Search
CPC .. G06F 12/122; G06F 9/5016; G06F 2212/62; G06F 12/0806; G06F 12/0833; G06F 2212/283
USPC ........................................................ 711/139
See application file for complete search history.

(56) References Cited

U.S. PATENT DOCUMENTS

| 5,043,885 | A | * | 8/1991 | Robinson | ............. G06F 12/124 711/133 |
| 9,112,922 | B2 | * | 8/2015 | Benoit | ................ H04L 67/2852 |
| 2004/0034744 | A1 | * | 2/2004 | Karlsson | ........... G06F 17/30902 711/133 |

* cited by examiner

*Primary Examiner* — Matthew Bradley
(74) *Attorney, Agent, or Firm* — Campbell Stephenson LLP

(57) ABSTRACT

Various systems and methods for adjusting threshold access frequency based on cache pressure are disclosed. The threshold access frequency is adjusted based on a block of data in a storage volume that has an access frequency matching or exceeding the threshold access frequency. The threshold access frequency is used to determine whether the block of data should be inserted into the cache from the storage volume.

21 Claims, 12 Drawing Sheets

| Block 205 | Access Frequency 215 | Interval of Time 230 | Threshold Access Frequency 220 | Cache Pressure 250 | Cache Occupancy 255 | Action 305 |
|---|---|---|---|---|---|---|
| 205(1) | 2 | T1 | 2 | High [free space was available for two blocks] | Over utilized [one block evicted from cache; cache churn] | Increase threshold access frequency to 3 for interval T2 |
| 205(2) | 4 | | | | | |
| 205(3) | 3 | | | | | |
| 205(1) | 2 | T2 | 4 | Low [free space was available for two blocks] | Under utilized [free space for one more block not utilized] | Decrease threshold access frequency to 3 for interval T3 |
| 205(2) | 4 | | | | | |
| 205(3) | 3 | | | | | |
| 205(1) | 2 | T3 | 3 | Optimal [free space was available for two blocks] | 100% utilized [no free space; no eviction; no cache churn] | Maintain threshold access frequency of 3 for interval T4 |
| 205(2) | 4 | | | | | |
| 205(3) | 3 | | | | | |
| ... | ... | ... | ... | ... | ... | ... |

| Block 205 | Access Frequency 215 | Varied Interval of Time 310 | Threshold Access Frequency 220 | Cache Pressure 250 | Cache Occupancy 255 | Action 305 |
|---|---|---|---|---|---|---|
| 205(1) | 6 | T1 + 10 | | | | |
| 205(2) | 4 | T1 | 4 | High [free space was available for two blocks] | Over utilized [one block evicted from cache; cache churn] | Increase threshold access frequency to 5 for interval T2 |
| 205(3) | 5 | T1 + 5 | | | | |
| 205(1) | 6 | T2 + 10 | | | | |
| 205(2) | 4 | T2 | 6 | Low [free space was available for two blocks] | Under utilized [free space for one more block not utilized] | Decrease threshold access frequency to 5 for interval T3 |
| 205(3) | 5 | T2 + 5 | | | | |
| 205(1) | 6 | T3 + 10 | | | | |
| 205(2) | 4 | T3 | 5 | Normal [free space was available for two blocks] | 100% utilized [no free space; no eviction; no cache churn] | Maintain threshold access frequency of 5 for interval T4 |
| 205(3) | 5 | T3 + 5 | | | | |
| ... | ... | ... | ... | ... | ... | ... |

*FIG. 3B*

CACHE INSERTION BASED ON THRESHOLD ACCESS FREQUENCY

FIELD OF THE INVENTION

This invention relates to inserting data in a level two cache and, more particularly, to inserting data into a level two cache based on a threshold access frequency.

DESCRIPTION OF THE RELATED ART

A multi-queue caching solution has multiple queues for a data block that is inserted into a level two cache. When a data block becomes a candidate to be cached, it is inserted into the level two cache and is put into a first queue. The inserted data block either remains in the first queue or is demoted to a lower queue within the level two cached based on its access frequency. Data blocks to be evicted are moved from higher level queues to lower level queues.

Cache insertion methodologies insert a data block from a storage volume to a level two cache on its first access (e.g., when the data block is accessed once). Subsequently, the data block either remains in the cache (e.g., if it has a high access frequency) or gets evicted (e.g., if it is not accessed or has a low access frequency). Constant insertion (e.g., from a storage volume to a level two cache) and eviction (e.g., from a level two cache) of data blocks leads to cache churn which drastically slows down system performance.

Caching using a solid state disk (SSD) is a costly operation. Existing cache insertion solutions suffer from at least two shortcomings. First, they may not qualify which data blocks deserve to be inserted to a level two cache (e.g., all data blocks are inserted upon a first access). Second, the aforementioned perpetual insertion and eviction of data blocks leads to cache churn and a less than optimal utilization of the level two cache itself.

SUMMARY OF THE INVENTION

Various systems and methods for adjusting a threshold access frequency of a total number of blocks in a storage volume that have an access frequency matching or exceeding the threshold access frequency are disclosed. One such method involves counting the total number of blocks in a storage volume that have an access frequency matching or exceeding the threshold access frequency. The access frequency is the number of times a block is accessed by a computer system during an interval of time. The threshold access frequency is used to determine whether the block should be inserted into a cache from the storage volume. The threshold access frequency is increased if the total number of blocks exceeds a number of blocks that can be stored in the cache. The threshold access frequency is decreased if the total number of blocks is lower than the number of blocks that can be stored in the cache.

In some embodiments, the threshold access frequency is decreased if, after the interval of time, the number of blocks inserted into the cache from the total number of blocks in the storage volume that have the access frequency matching or exceeding the threshold access frequency is less than the number of blocks that can be stored in the cache. Conversely, the threshold access frequency is increased if, after the interval of time, the number of blocks inserted into the cache from the total number of blocks in the storage volume that have the access frequency matching or exceeding the threshold access frequency is greater than the number of blocks that can be stored in the cache.

In one embodiment, adjusting the threshold access frequency is based on a cache pressure of the cache prior to permitting insertion of another block from the storage volume to the cache. The cache pressure is determined by calculating the access frequency of blocks inserted into the cache from the storage volume after the interval of time and calculating the access frequency of one or more blocks existing in the cache after the interval of time. The one or more blocks existed prior to the insertion of blocks from the storage volume into the cache during the interval of time.

Determining cache pressure also comprises calculating a cache occupancy of the cache after the interval of time by counting the number of blocks in the cache that do not match or exceed the threshold access frequency after the interval of time and also counting the number of blocks in the cache that match or exceed the threshold access frequency after the interval of time.

In some embodiments, determining whether the cache pressure is high comprises identifying that the number of blocks that can be inserted into the cache is greater than the number of blocks that can be stored in the cache and/or identifying that after the interval of time, the access frequency of one or more blocks existing in or inserted into the cache is lower than the threshold access frequency. The determination of whether the cache pressure is high indicates that the cache is being over-utilized. In one embodiment, upon an indication that the cache is being over-utilized, the threshold access frequency is increased prior to permitting insertion of another block from the storage volume to the cache.

In other embodiments, determining whether the cache pressure is low comprises identifying that the number of blocks that can be inserted into the cache is lower than the number of blocks that can be stored in the cache and/or identifying that after the interval of time, the access frequency of one or blocks existing in or inserted into the cache is higher than the threshold access frequency. The determination of whether the cache pressure is low indicates that the cache is being under-utilized. In one embodiment, upon an indication that the cache is being under-utilized, the threshold access frequency is decreased prior to permitting insertion of another block from the storage volume to the cache.

The foregoing is a summary and thus contains, by necessity, simplifications, generalizations and omissions of detail; consequently those skilled in the art will appreciate that the summary is illustrative only and is not intended to be in any limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features and advantages made apparent to those skilled in the art by referencing the accompanying drawings.

FIG. 3A is a table illustrating adjusting the threshold access frequency based on the cache pressure and a cache occupancy after an interval of time, according to one embodiment of the present invention.

FIG. 3B is a table illustrating adjusting the threshold access frequency based on the cache pressure and a cache occupancy after varying the interval of time, according to one embodiment of the present invention.

Figure 1A:
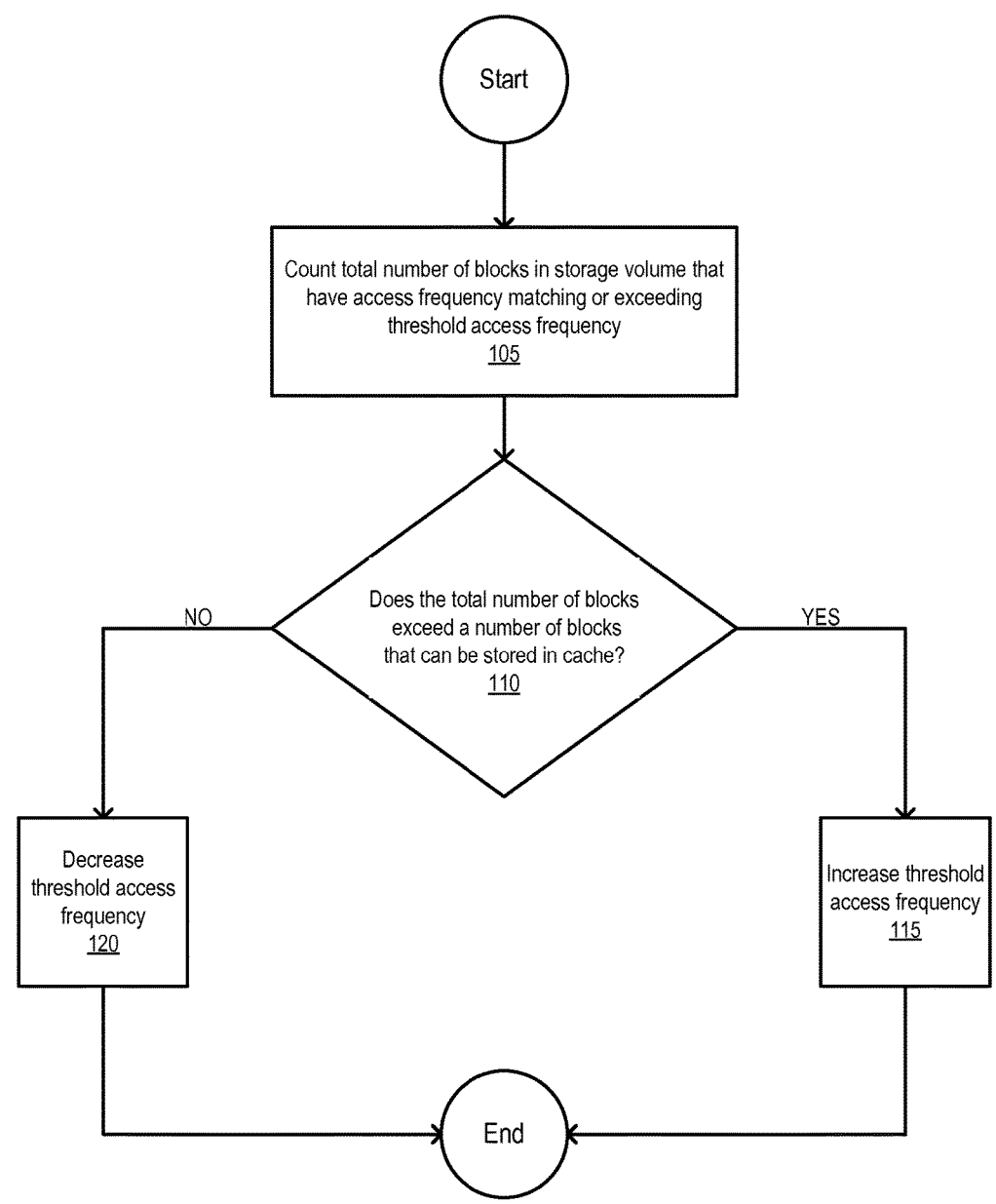
FIG. 1A is a flowchart of a method of counting a total number of blocks in a storage volume that have an access frequency matching or exceeding a threshold access frequency and increasing or decreasing the threshold access frequency based on whether the total number of blocks exceed a number of blocks that can be stored in the cache, according to one embodiment of the present invention.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

FIG. 1 is a flowchart of a method of counting a total number of blocks in a storage volume that have an access frequency matching or exceeding a threshold access frequency and increasing or decreasing the threshold access frequency based on whether the total number of blocks exceed a number of blocks that can be stored in the cache. The method is implemented by one or more systems illustrated in FIGS. 2A, 2B 2C, 5A, and 5B.

The method begins at operation 105 by counting the total number of blocks (e.g., blocks 205(1)-(N)) in a storage volume 210 that have an access frequency 215 matching or exceeding a threshold access frequency 220. At operation 110, the method determines whether the total number of blocks (with the access frequency 215 matching or exceeding a threshold access frequency 220) exceed a number of blocks that can be stored in a cache 235. According to some embodiments, and as shown by operation 115, if the total number of blocks exceed the number of blocks that can be stored in cache 235, the threshold access frequency 220 is increased. Similarly, and as shown by operation 120, if the total number of blocks do not exceed the number of blocks that can be stored in cache 235, the threshold access frequency 220 is decreased.

Figure 1B:
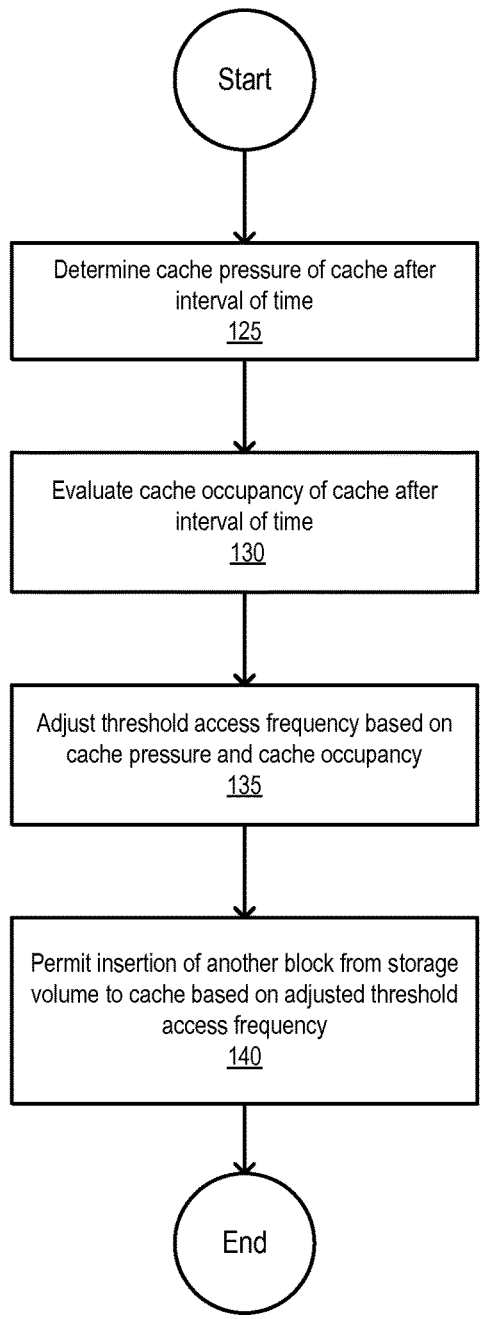
FIG. 1B is a flowchart of a method of determining a cache pressure of a cache after an interval of time and adjusting the threshold access frequency based on the cache pressure and a cache occupancy, according to one embodiment of the present invention.

FIG. 1B is a flowchart of a method of determining a cache pressure 250 of cache 235 after an interval of time 230 and adjusting threshold access frequency 220 based on cache pressure 250 and a cache occupancy 255. As with the method shown in FIG. 1A, the method of FIG. 1B is also implemented by one or more systems illustrated in FIGS. 2A, 2B 2C, 5A, and 5B.

The method begins at operation 125 by determining cache pressure 250 of cache 235 after interval of time 230. The method then proceeds to operation 130 and evaluates cache occupancy 255 of cache 235 after interval of time 230. At operation 135, threshold access frequency 220 is adjusted based on cache pressure 250 and cache occupancy 255. The method ends at operation 140 by permitting insertion of another block from storage volume 210 to cache 235 based on adjusted threshold access frequency 220, which is adjusted, if necessary, based on cache pressure 250 and cache occupancy 255.

Figure 2A:
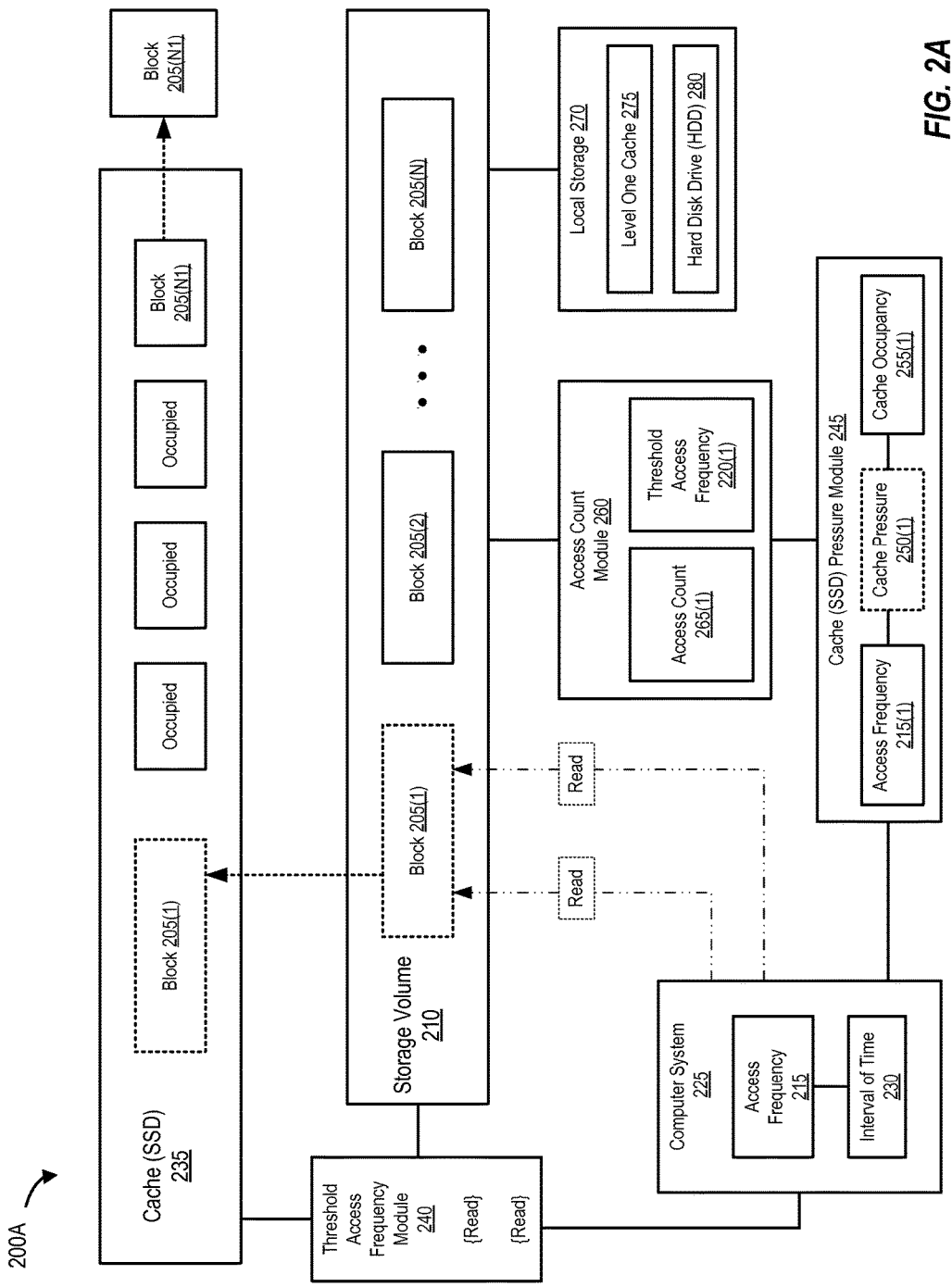
FIG. 2A is a block diagram of a system that determines cache pressure of a cache based on the threshold access frequency, according to one embodiment of the present invention.
Figure 2B:
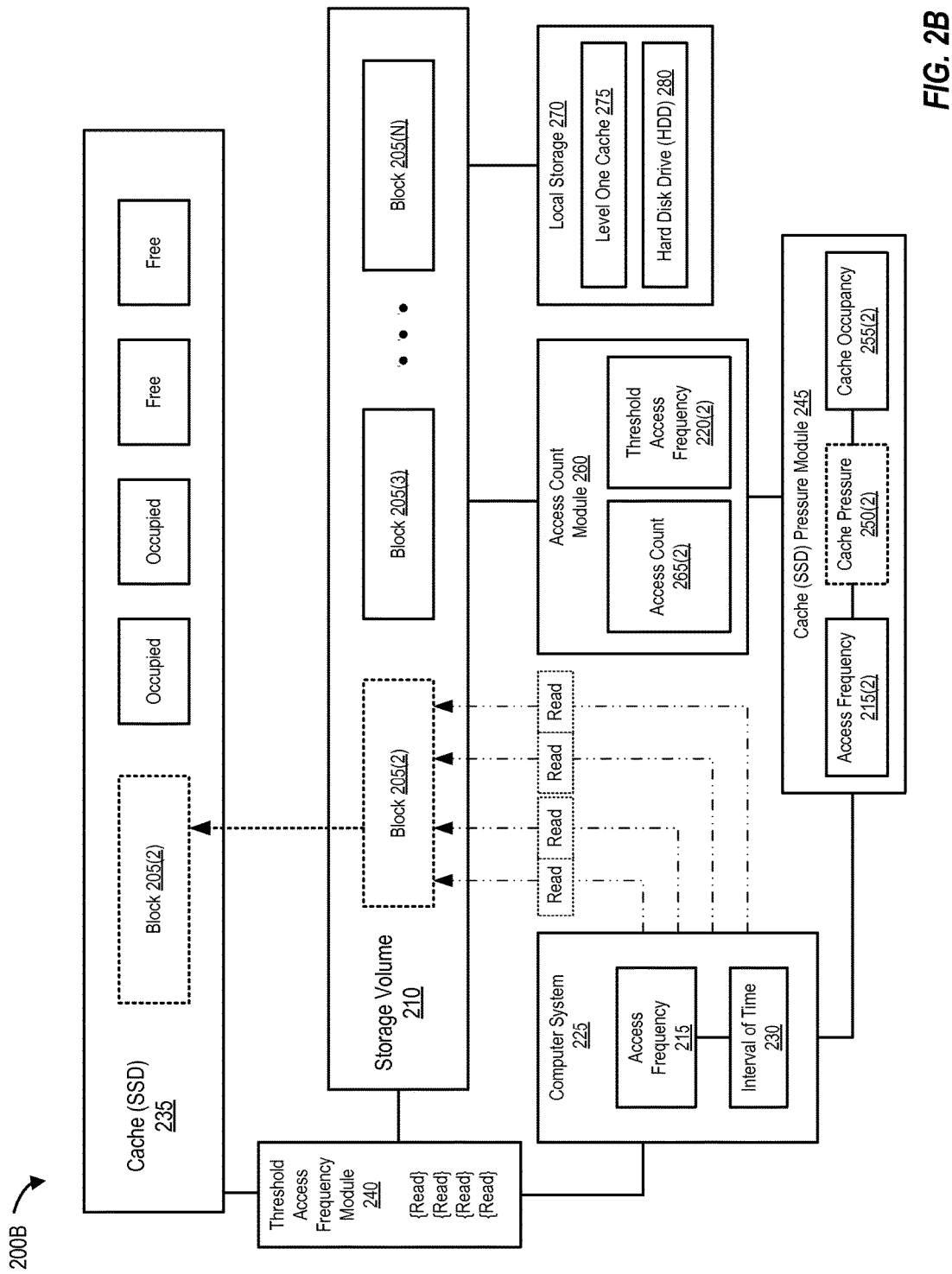
FIG. 2B is a block diagram of a system that determines cache pressure of a cache based on the threshold access frequency, according to one embodiment of the present invention.
Figure 2C:
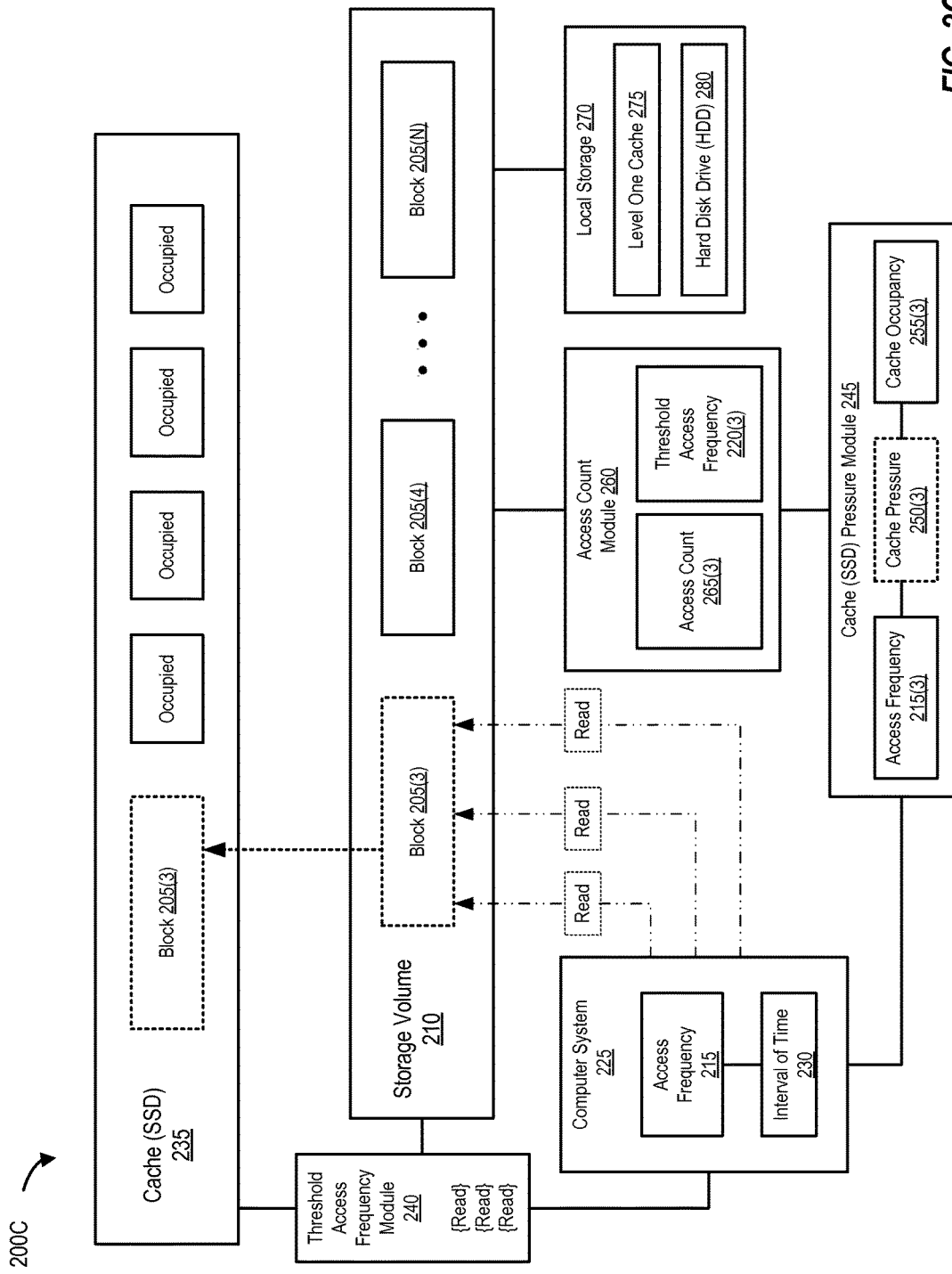
FIG. 2C is a block diagram of a system that determines cache pressure of a cache based on the threshold access frequency, according to one embodiment of the present invention.

FIGS. 2A, 2B and 2C are block diagrams of one or more systems that determine cache pressure 250 of cache 235 based on threshold access frequency 220. As shown, computer system 225 is coupled to storage volume 210. Computer system 225 can be any of a variety of different types of computing devices and/or systems, including a server, personal computing device, laptop computer, net book, personal digital assistant, cellular phone, or the like.

Storage volume 210 can include one or more of a variety of different storage devices, including hard drives, compact discs, digital versatile discs, solid state drive (SSD) memory such as Flash memory, and the like, or one or more logical storage devices such as volumes implemented on one or more such physical storage devices. Computer system 225 and storage volume 210 can be integrated or separate. If separate, computer system 225 and storage volume 210 can be coupled by a network such as the Internet or a storage area network. Storage volume 210 can be comprised within local storage 270 which may have hard disk drive (HDD) 280 with a level one cache 275. In another scenario, storage volume 210 can also be an instance of a storage volume comprised within local storage 270 (e.g., within HDD 280 with level one cache 275) that is logically implemented on another persistent storage device.

In this example, computer system 225 implements several software modules. Each software module can be any of a variety of different types of software programs, including programs that act as servers (e.g., database management systems, file servers, email servers, and the like) and programs that act as clients (e.g., email clients, web browsers, backup clients, and the like). The various software modules implemented by computer system 225 can alternatively be stand-alone user-level programs (e.g., a document processing application, a graphics editing program, a media player, or the like) and can access block 205 in order to display, edit, execute, or otherwise process the data contained within block 205.

The block diagram of FIG. 2A illustrates an example in which block 205(1), which is resident on storage volume 210, has an access frequency of two (2). Access frequency 215 of a region of storage volume 210 is a measure of how many times a data region of storage volume 210 (e.g., as exemplified by block 205(1)) is accessed during interval of time 230. Access of block 205(1) can include a read of or write to block 205(1). In the case of a read operation, the access count 265(1) of block 205(1) is calculated to determine whether block 205(1) should be inserted into cache 235.

In one embodiment, access count module 260 determines access count 265(1) of block 205(1) and compares access count 265(1) with threshold access frequency 220(1). Threshold access frequency 220(1) is a pre-determined access frequency that block 205(1) must match or exceed before it is determined to be a candidate that can be inserted into cache 235. Access frequency 215(1) of block 205(1) is the number of times block 205(1) is accessed (e.g., read from or written to) during interval of time 230 (which, in this example, is fixed).

In some embodiments, when access frequency 215(1) of block 205(1) matches or exceeds threshold access frequency 220(1), it may be inserted into cache 235, if not already in cache 235. In this example, threshold access frequency 220(1) is at least two (2) or greater because it takes two read (or write) operations of block 205(1) to insert block 205(1) into cache 235. Upon insertion of block 205(1) into cache 235, threshold access frequency module 240 determines the changes caused to cache 235 by the insertion of block 205(1). These changes include evaluating cache pressure 250(1) and cache occupancy 255(1) of cache 235. In the example of FIG. 2A, insertion of block 205(1) into cache 235 causes block 205(N1) to be evicted from cache 235 to make room for other blocks with higher access frequencies. The resultant over-utilization of cache 235 is undesirable because constant insertion and eviction of data blocks from cache 235 can lead to cache churn and a drop in system performance.

In another example, the block diagram of FIG. 2B illustrates a situation in which block 205(2), which is resident on storage volume 210, has an access frequency of four (4). In this example, threshold access frequency 220(2) is at least four (4) or greater because it takes four (4) read (or write) operations of block 205(2) to insert block 205(2) into cache 235. Upon insertion of block 205(2) into cache 235, threshold access frequency module 240 determines the changes caused to cache 235 by the insertion of block 205(2) by evaluating cache pressure 250(2) and cache occupancy 255(2) of cache 235. In the example of FIG. 2B, insertion of block 205(2) into cache 235 does not result in an optimal cache occupancy 255(2) because cache 235 has un-used free space. Like the example described in relation to FIG. 1A, under-utilization of cache 235 is also undesirable because given the advantages of SSD caching (e.g., speed of retrieving cached information) and its high cost, cache 235 should be utilized fully, or at least as close to fully as possible.

FIG. 2C is a block diagram of a system that determines cache pressure 250(3) of cache 235 based on threshold access frequency 220(3) and illustrates a situation in which block 205(3), which is resident on storage volume 210, has an access frequency of three (3). In this example, threshold access frequency 220(3) is at least three (3) or greater because it takes three (3) read operations of block 205(3) to insert block 205(3) into cache 235, if it is not already in cache 235. Upon insertion of block 205(3) into cache 235, threshold access frequency module 240 determines the changes caused to cache 235 by the insertion of block 205(3) by evaluating cache pressure 250(3) and cache occupancy 255(3) of cache 235.

However, unlike the undesirable cache occupancy results depicted in FIGS. 2A and 2B (e.g., over-utilization of FIG. 2A and under-utilization of FIG. 2B), a threshold access frequency of three (3) results in cache 235 being fully occupied with blocks that have an access frequency of three (3) or greater (e.g., they match or exceed the value assigned to the threshold access frequency, which in this example, is three (3)). Therefore, according to some embodiments, cache (SSD) pressure module 245 can determine cache occupancy 255(3) of cache 235 based on cache pressure 250(3) of cache 235, and in conjunction with threshold access frequency module 240, can also determine that a particular threshold access frequency value of three (3) will result in optimal utilization of cache 235 for interval of time 230, while at the same time, ensuring that cache 235 is populated with the most deserving blocks (e.g., blocks which have a high access frequency) during interval of time 230.

In one embodiment, when faced with over-utilization of cache 235 (as depicted and described in relation to FIG. 2A), threshold access frequency 220 can be increased if, after interval of time 230, the number of blocks inserted into cache 235 from the total number of blocks in storage volume 210 that have access frequency 215 matching or exceeding threshold access frequency 220 is greater than the number of blocks that can be stored in cache 235.

FIG. 3A is a table that illustrates adjusting (or maintaining) threshold access frequency 220 (for a next and/or upcoming interval of time) based on cache pressure 250 and cache occupancy 255 calculated after interval of time 230. For example, if the value of threshold access frequency 220 is two (2) and blocks 205(1), 205(2) and 205(3) have access frequencies of two (2), four (4) and three (3) respectively (e.g., access counts of blocks 205(1), 205(2) and 205(3) during interval of time 230), all three blocks are inserted into cache 235 because all three blocks have access frequency 215 of at least two (2) or greater. Insertion of all three blocks into cache 235 causes cache pressure 250 of cache 235 to be high. Cache occupancy 255 of cache 235 is over-utilized which causes cache 235 to evict blocks with resultant cache churn (e.g., as shown in relation to block 205(N1) of FIG. 2A). This undesirable situation can be remedied by increasing threshold access frequency 220 to three (3) for the next or upcoming interval of time 230 (e.g., interval of time T2).

In a different embodiment, when faced with under-utilization of cache 235 (as depicted and described in relation to FIG. 2B), threshold access frequency 220 can be decreased if, after interval of time 230, the number of blocks inserted into cache 235 from the total number of blocks in storage volume 210 that have access frequency 215 matching or exceeding threshold access frequency 220 is less than the number of blocks that can be stored in cache 235.

FIG. 3A illustrates decreasing threshold access frequency 220 (for a next and/or upcoming interval of time) based on cache pressure 250 and cache occupancy 255 calculated after interval of time 230. For example, if the value of threshold access frequency 220 is four (4) and blocks 205(1), 205(2) and 205(3) have access frequencies of two (2), four (4) and three (3) respectively (e.g., access counts of blocks 205(1), 205(2) and 205(3) during interval of time 230), only blocks 205(2) is inserted into cache 235 because only block 205(2) has access frequency 215 of at least four (4) or greater. Insertion of block 205(2) into cache 235 causes cache pressure 250 of cache 235 to be low. Cache occupancy 255 of cache 235 is under-utilized which reflects un-utilized free space in cache 235 (e.g., as shown in FIG. 2B). This undesirable situation can be remedied by decreasing threshold access frequency 220 to three (3) for the next or upcoming interval of time 230 (e.g., interval of time T3).

FIG. 3A also illustrates an optimal cache insertion and utilization scenario where during interval of time 230, the value of threshold access frequency 220 is set to three (3). In this example, two out of three blocks are inserted into cache 235 based on access frequency 215 and threshold access frequency 220. Insertion of blocks 205(2) and 205(3) into cache 235 reveals at least two advantages. First, blocks 205(2) and 205(3) have high access frequencies (e.g., blocks 205(2) and 205(3) contain hot data) and are thus the best candidates most deserving of being inserted into and occupying cache 235. Second, insertion of blocks 205(2) and 205(3) into cache 235 with a measured and adjusted threshold access frequency 220 of three (2), ensures that cache 225 is fully utilized with no free space, no cache eviction and no cache churn (e.g., as shown in FIG. 2C). This then is an optimal operating condition of cache 225 and therefore the value of threshold access frequency 220 is maintained at three (3) for the next or upcoming interval of time (e.g., interval of time T4).

In some embodiments, the value of threshold access frequency 220 is adjusted (e.g., increased or decreased) based on cache pressure 250 of cache 235 prior to permitting insertion of another block from storage volume 210 to cache 235. Cache pressure 250 is, at least in one embodiment, is the condition of cache 235 after the insertion of blocks from storage volume 210. Condition of cache 235 can include a measurement of the cache occupancy of cache 235 as well as cache churn and cache eviction related to cache 235. Overworking cache 235 with too many wasteful accesses (e.g., too many redundant insertions and evictions of blocks) results in a high cache pressure. Conversely, underworking cache 235 which manifests itself as wasteful un-used space on cache 235 results in a low cache pressure.

In one embodiment, determining cache pressure 250 of cache 235 comprises calculating access frequency 215 of the blocks that should be inserted into cache 235 from storage volume 210 after interval of time 230 and further calculating access frequency 215 of one or more blocks existing in cache 235 after interval of time 230. It should be noted that the one or more blocks existing in cache 235 after interval of time 230 existed in cache 235 prior to the insertion of the blocks from storage volume 210 into cache 235 during interval of time 230.

In other embodiments, determining cache pressure 250 of cache 235 also comprises calculating cache occupancy 255 of cache 235 after interval of time 230. The number of blocks in cache 235 that do not match or exceed threshold access frequency 220 are counted after interval of time 230. The number of blocks in cache 235 that match or exceed threshold access frequency 220 after interval of time 230 are also counted. In an alternate embodiment, cache occupancy 255 of cache 235 is the ratio of unused blocks and used blocks in cache 235.

A high or low cache pressure 250 of cache 235 is undesirable and does not reflect the optimal operating condition of cache 235. In one embodiment determining whether cache pressure 250 is high comprises identifying that the number of blocks that should be inserted into cache 235 is greater than the number of blocks that can be stored in cache 235 and/or identifying that after interval of time 230, access frequency 215 of one or more blocks existing in or inserted into cache 235 is lower than threshold access frequency 220. In another embodiment, determining whether cache pressure 250 is low comprises identifying that the number of blocks that can be inserted into cache 235 is lower than the number of blocks that can be stored in cache 235 and/or identifying that after interval of time 230, access frequency 215 of one or more blocks existing in or inserted into cache 235 is higher than threshold access frequency 220.

It will be appreciated that the value of threshold access frequency 220 can be a static value or can be determined dynamically. In one embodiment, the value of threshold access frequency 220 for cache 235 is determined based on cache pressure 250. In a different embodiment, the value of threshold access frequency 220 for cache 235 can be determined based on historical information (e.g., cache performance during previous intervals of time and/or information from historical intervals of time). The goal is to determine a value of threshold access frequency 220 that would best utilize cache 235 by reducing cache churn (e.g., rate of eviction) by ensuring that only the most important blocks and/or regions make it into cache 235.

A data region (e.g., block 205) stored in cache 235 has an associated "state." In one embodiment, the state of the region is determined based on access frequency 215 of the region (e.g., access frequency 215(1) of block 205(1)). In this example, the state of the region and/or block can have the following values: HOT indicates that the region has been accessed from cache 235 equal to or greater than the number of times required by threshold access frequency 220 (e.g., access frequency 215 is greater than threshold access frequency 220) in the last interval of time 230, WARM indicates that the region was marked HOT in the last interval of time 230, but has not been accessed equal to or greater than the number of times required by threshold access frequency 220 (e.g., access frequency 215 is lower than threshold access frequency 220) since the last interval of time 230, and COLD indicates that the region was WARM in the last interval of time 230, but has not been accessed equal to or greater than the number of times required by threshold access frequency 220 (e.g., access frequency 215 is lower than threshold access frequency 220) since the last interval of time 230. In some embodiments, regions and/or blocks in the COLD state are eligible for eviction from cache 235 and are evicted from cache 235 based on cache occupancy 255 of cache 235 (e.g., when the space occupied by blocks in the COLD state are needed by blocks in a HOT state).

In some embodiments, threshold access frequency module 240 evaluates cache 235 after interval of time 230 to determine whether there has been a change in the state of the regions of cache 235 after interval of time 230. For example, a region that is HOT can become WARM and can then proceed to the COLD state if the region is not accessed more than the number of times required by threshold access frequency 220. It should be noted that the transition from HOT to COLD is slower because the region has to first pass through the WARM state. However, it will be appreciated that the transition from a lower state (e.g., COLD state) to a higher state (e.g. HOT state) is faster. For example, if a COLD region is accessed more than the number of times required by threshold access frequency 220, it will be marked as HOT and will not be evicted from cache 235.

FIG. 3B is a table that illustrates adjusting (or maintaining) threshold access frequency 220 (for a next and/or upcoming interval of time) based on cache pressure 250 and cache occupancy 255 calculated after a varied interval of time 310. Unlike interval of time 230 of FIG. 3A (e.g., a fixed interval of time), the interval of time in this embodiment is varied. It will be appreciated that varied interval of time 310 can be implemented to offset some of the costs associated with measuring threshold access frequency 220 during fixed interval of time 230. For example, if cache 235 has a lot of free space, adjusting threshold access frequency 220 after a fixed interval of time 230 becomes redundant. Frequently adjusting threshold access frequency 220 based on fixed interval of time 230 also results in blocks being marked for eviction when they do not necessarily need to be evicted, for example, because cache 235 has enough free space to store the blocks marked for eviction without causing a drop in system performance. In addition, frequently recalculating threshold access frequency 220 and eviction operations are both process intensive and costly operations.

In some embodiments, threshold value 220 is dependent on cache pressure 250. For example, varied interval of time 310 is varied to delay the determination of whether threshold access frequency 220 must be adjusted until such time when cache pressure 250 is sufficiently high (e.g., there are not enough free blocks in cache 235). Varying interval of time 230 also provides fair treatment to blocks which get accessed consistently, but over a longer period of time, as opposed to blocks which get accessed in a spike (e.g., blocks with access frequency 215 that is higher over a longer interval of time but is lower if measured during a shorter interval of time). It will be appreciated that blocks which get accessed consistently over a longer of period of time may nonetheless be important candidates for inclusion into cache 235 even though they may not be inserted into cache 235 based on fixed interval of time 230 because access frequency 214 of these blocks may not be equal or greater than threshold access frequency 220. In addition, because eviction operations are also costly and process intensive, varying interval of time 230 also helps in reducing cost because when there is no cache pressure 250, evictions can be delayed to avoid the cost.

In other embodiments, varied interval of time 310 is made and kept proportional to cache pressure 250. For example, if cache 235 is nearly empty and has lots of free space, there is no need to re-calculate and/or re-adjust threshold access frequency 220. However, threshold access frequency 220 has to be re-calculated and/or re-adjusted at some point in time because presumably, cache 235 is getting full. Therefore, in one embodiment, varied interval of time 310 has an upper limit which determines the maximum wait time before threshold access frequency 220 is re-calculated and/or re-adjusted.

Figure 4:
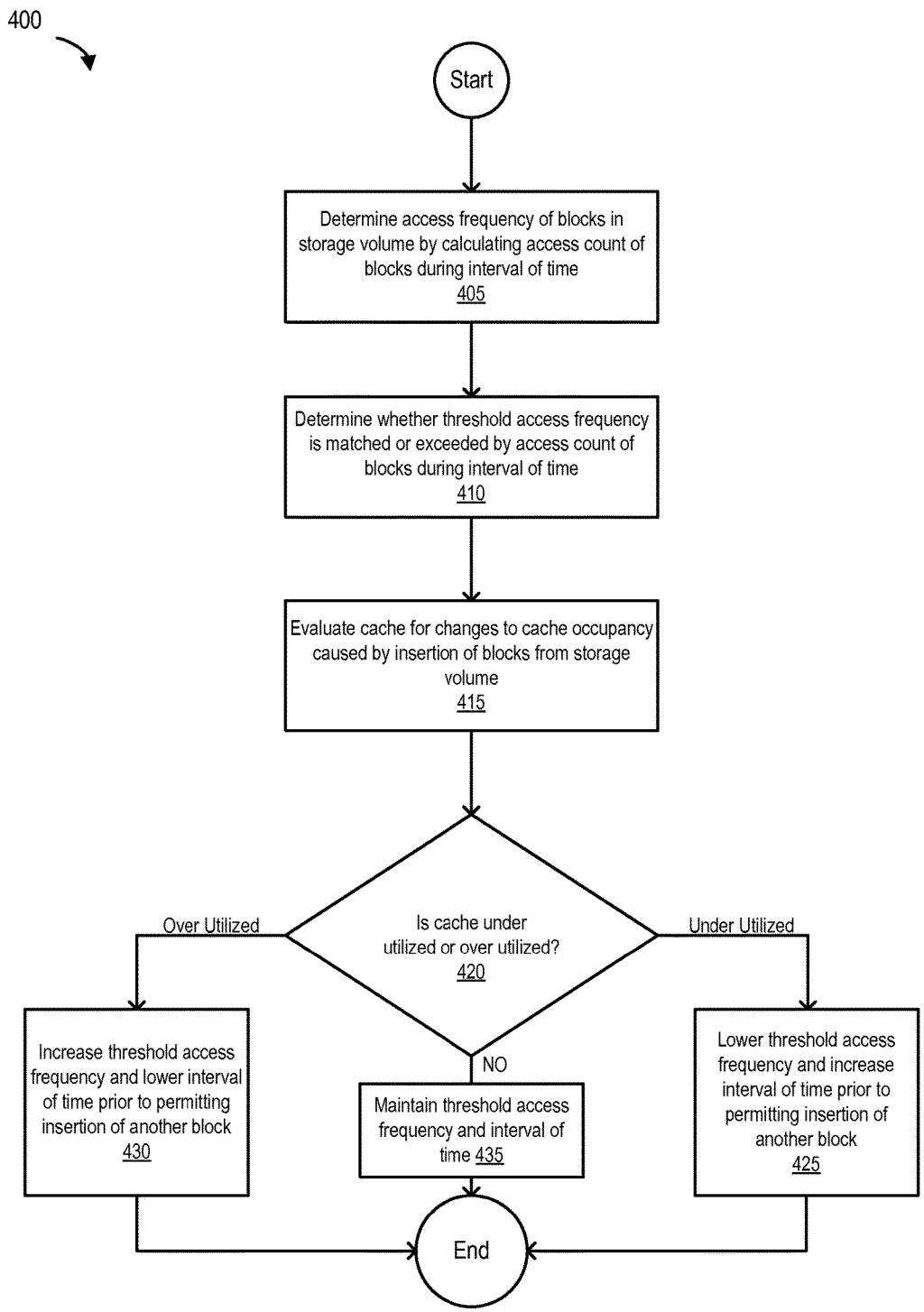
FIG. 4 is a flowchart of a method of determining threshold access frequency based on cache pressure and varying the duration of interval of time based on cache pressure, according to one embodiment of the present invention.

FIG. 4 is a flowchart of a method of determining threshold access frequency 220 based on cache pressure 250 and varying the duration of interval of time 230 based on cache pressure 250. The method begins at operation 405 by determining access frequency 215 of blocks in storage volume 210 by calculating access count 265 of blocks during interval of time 230. At operation 410, the method involves determining whether threshold access frequency 220 is matched or exceeded by access count 265 of blocks during interval of time 230. The method then proceeds to operation 415 and evaluates cache 235 for changes to cache occupancy 255 caused by insertion of blocks from storage volume 210. At operation 420, the method determines cache pressure 250 of cache 235 by determining whether cache 235 is over-utilized (e.g., high cache pressure) or under-utilized (e.g., low cache pressure).

In some embodiments, if cache 235 is under-utilized, the method, at step 425, lowers threshold access frequency 220 and increases interval of time 230 (e.g., as shown by varied interval of time 310 of FIG. 3B) prior to permitting insertion of another block from storage volume 210 to cache 235. In other embodiments, if cache 235 is over-utilized the method, at step 430, increases threshold access frequency 220 and lowers interval of time 230 (e.g., as shown by varied interval of time 310 of FIG. 3B) prior to permitting insertion of another block from storage volume 210 to cache 235. If cache 235 is neither over-utilized nor under-utilized (e.g., cache pressure 250 is normal), the method, at step 435, maintains threshold access frequency 220 and the duration of interval of time 230 for the next and/or upcoming interval of time. Therefore, the duration of time of interval of time 230 can depend on cache pressure 250. In some embodiments, the insertion of block 205 into cache 235 can be delayed until a new threshold access frequency 220(1) is obtained. The current threshold access frequency 220 can be used to make the decision to insert block 205 into cache 235 between the current interval of time 230 and the next interval of time when the threshold access frequency 220 may be recalculated.

Figure 5A:
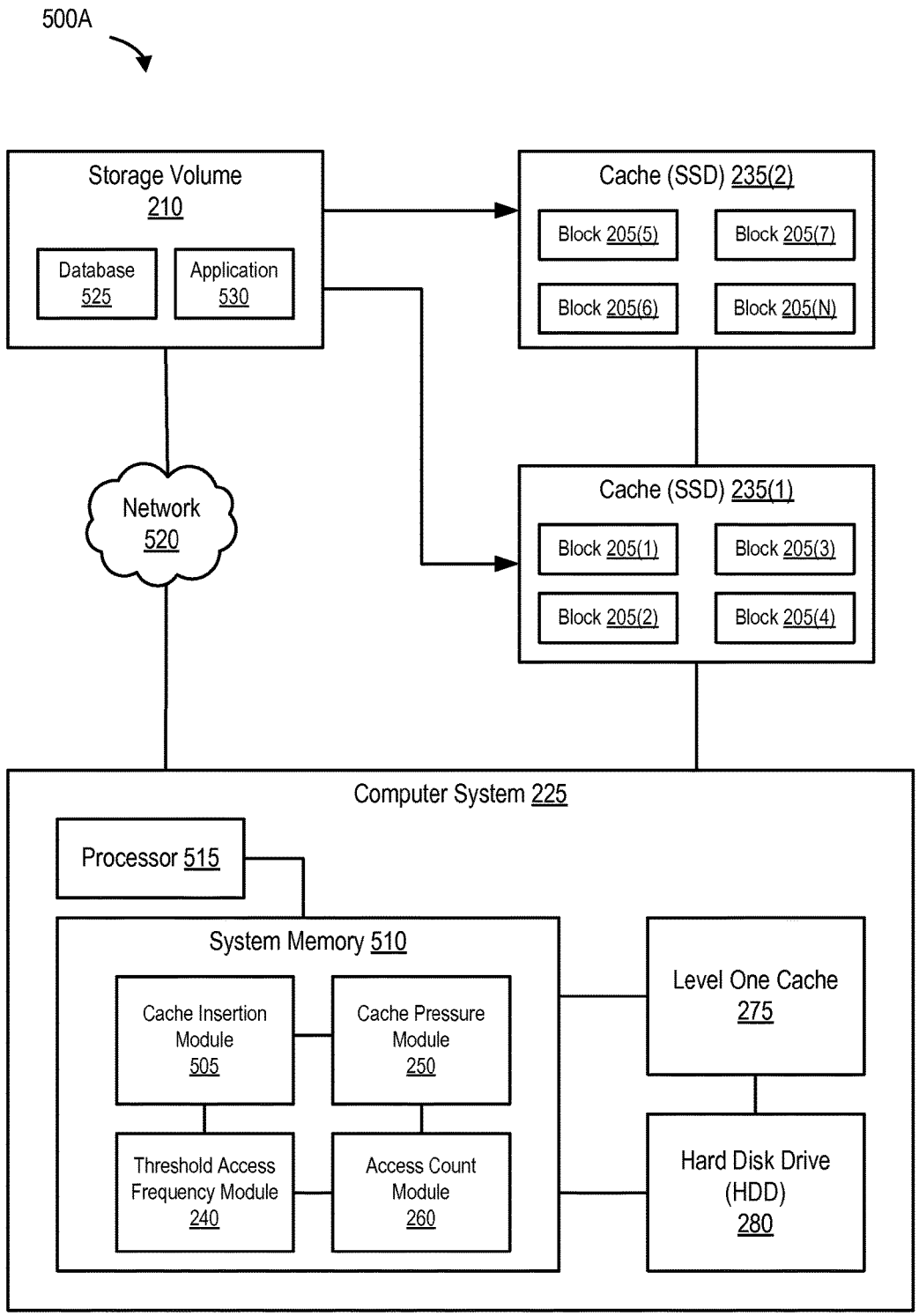
FIG. 5A is a block diagram of a system that controls and manages cache insertion based on threshold access frequency, according to one embodiment of the present invention.

FIG. 5A is a block diagram of a system that controls and manages cache insertion based on threshold access frequency 220. In this example, computer system 225 comprises system memory 510, processor 515, level one cache 275 and hard disk drive (HDD) 280. System memory 510 further comprises cache insertion module 505, threshold access frequency module 240, cache pressure module 250 and access count module 260. As depicted, computer system 225 can have multiple layers of tiered SSD caches (e.g., cache 235(1) and 235(2)). Computer system 225 can also be coupled to storage volume 210 through network 520. Storage volume 210 can run database 525 and application 530. It will be appreciated that blocks inserted from storage volume 210 to cache 235 can be shared among any number of tiered SSD caches as depicted in FIG. 5A by cache 235(1) and cache 235(2).

Figure 5B:
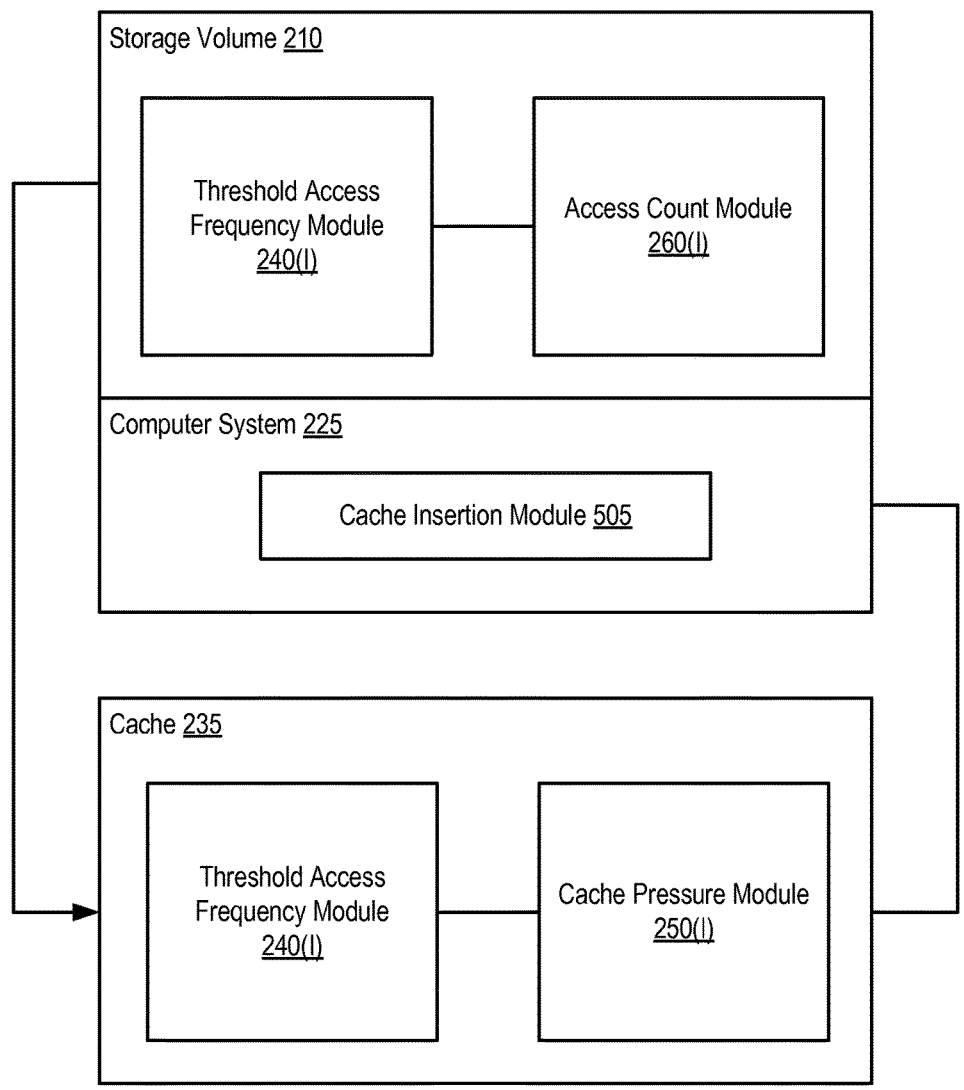
FIG. 5B is a block diagram of a system that controls and manages cache insertion based on threshold access frequency, according to one embodiment of the present invention.

FIG. 5B is another block diagram of a system that controls and manages cache insertion based on threshold access frequency 220. In this example, computer system 225 may comprise cache insertion module 505 and may be directly coupled to storage volume 210. Storage volume 210 may comprise threshold access frequency module 240(I) and access count module 260(I). Similarly, computer system 225 may be directly coupled to cache 235. Cache 235 may comprise threshold access frequency module 240(I) and cache pressure module 250(I). It will be appreciated that, the software modules illustrated in FIG. 5B can be instantiations of other software modules contained in computer system 225 and as shown in FIGS. 2A, 2B, 2C, and 5A. For example, storage volume 210 and cache 235 may each have an instance of threshold access frequency module 240 to determine threshold access frequency 220 of blocks resident in storage volume 210 and threshold access frequency 220 of blocks resident in cache 235 respectively.

It will be appreciated that the invention described herein improves the performance of a cache (e.g., a level two cache) at least by inserting the right blocks of data into the cache (e.g., blocks with high access frequencies) and ensuring that cache space is optimally utilized. In addition, among other benefits, the invention also provides cost savings for storage systems. The invention described herein can be implemented in with or in addition to existing caching solutions. The caching methodology described herein frees up bandwidth for installing and running multiple applications on a server. For example, instead of running one (1) instance of a database software on a given server, implementation of the invention described herein permits multiple instances of the database software to run on the same server, thus lowering licensing costs associated with the database software. Further, the invention may offer cost savings with respect to expensive tier 1 storage arrays. For example, a cheaper storage array with the caching methodology described herein can be implemented with an SSD cache to get the same performance as the more expensive tier 1 storage array.

Figure 6:
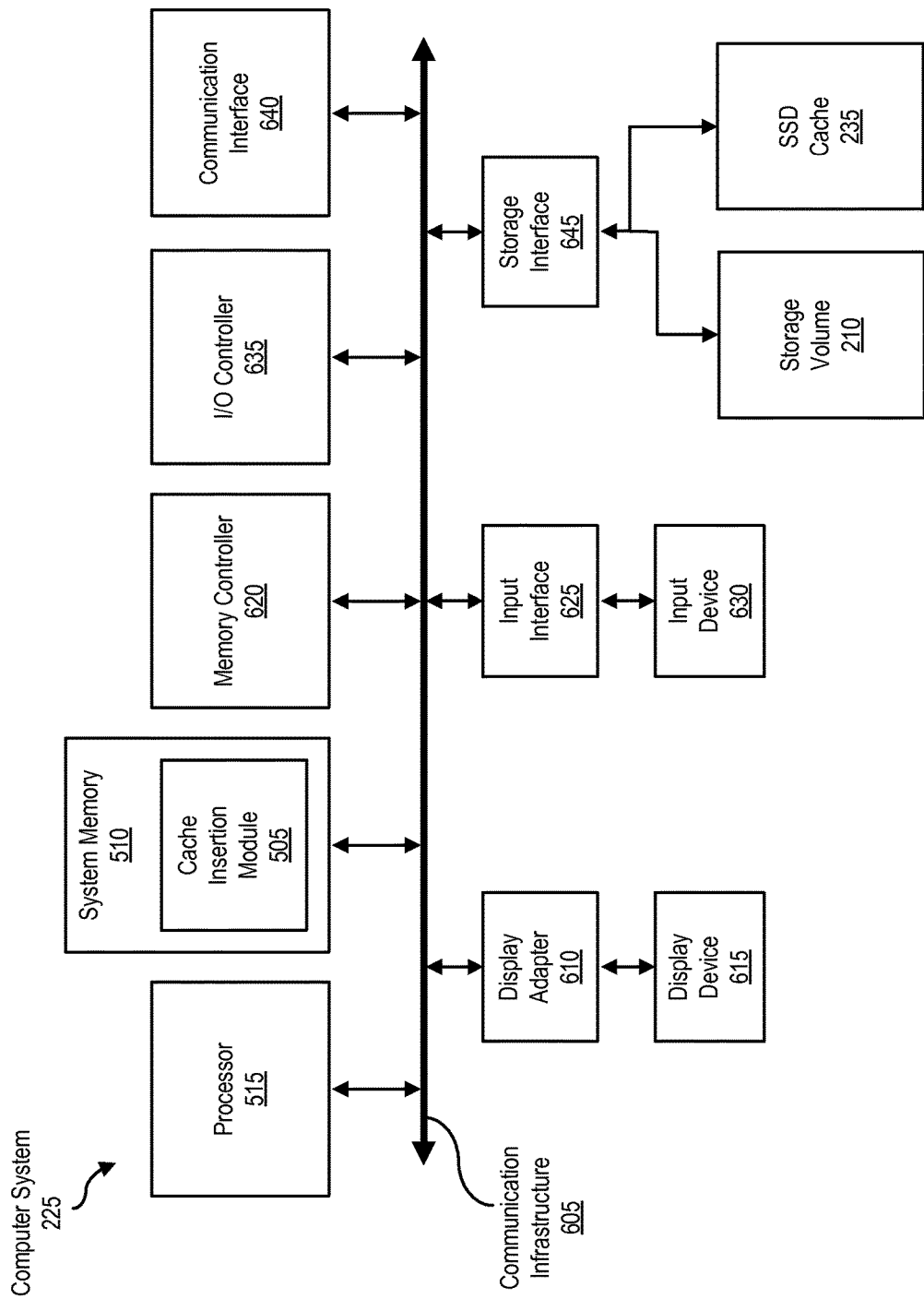
FIG. 6 is a block diagram of a computing system, illustrating how a cache insertion module can be implemented in software, according to one embodiment of the present invention.

FIG. 6 is a block diagram of a computer system 225 capable of implementing a cache insertion module 505 as described above. Computer system 225 broadly represents any single or multi-processor computing device or system capable of executing computer-readable instructions. Examples of computer system 225 include, without limitation, any one or more of a variety of devices including workstations, personal computers, laptops, client-side terminals, servers, distributed computing systems, handheld devices (e.g., personal digital assistants and mobile phones), network appliances, storage controllers (e.g., array controllers, tape drive controller, or hard drive controller), and the like. In its most basic configuration, computer system 225 may include at least one processor 515 and a system memory 510. By executing the software that implements cache insertion module 505, computer system 225 becomes a special purpose computing device that is configured to insert a block of data from a storage volume to an SSD cache based on the value of a threshold access frequency.

Processor 515 generally represents any type or form of processing unit capable of processing data or interpreting and executing instructions. In certain embodiments, processor 515 may receive instructions from a software application or module. These instructions may cause processor 515 to perform the functions of one or more of the embodiments described and/or illustrated herein. For example, processor 515 may perform and/or be a means for performing all or some of the operations described herein. Processor 515 may also perform and/or be a means for performing any other operations, methods, or processes described and/or illustrated herein.

System memory 510 generally represents any type or form of volatile or non-volatile storage device or medium capable of storing data and/or other computer-readable instructions. Examples of system memory 510 include, without limitation, random access memory (RAM), read only memory (ROM), flash memory, or any other suitable memory device. Although not required, in certain embodiments computer system 225 may include both a volatile memory unit (such as, for example, system memory 510) and a non-volatile storage device (such as, for example, storage volume 210 and/or SSD cache 235, as described in detail below). In one example, program instructions implementing a cache insertion module 505 may be loaded into system memory 510.

In certain embodiments, computer system 225 may also include one or more components or elements in addition to processor 515 and system memory 510. For example, as illustrated in FIG. 6, computer system 225 may include a memory controller 620, an Input/Output (I/O) controller 635, and a communication interface 640, each of which may be interconnected via a communication infrastructure 605. Communication infrastructure 605 generally represents any type or form of infrastructure capable of facilitating communication between one or more components of a computing device and/or system. Examples of communication infrastructure 605 include, without limitation, a communication bus (such as an Industry Standard Architecture (ISA), Peripheral Component Interconnect (PCI), PCI express (PCIe), or similar bus) and a network.

Memory controller 620 generally represents any type or form of device capable of handling memory or data or controlling communication between one or more components of computer system 225. For example, in certain embodiments memory controller 620 may control communication between processor 515, system memory 510, and I/O controller 635 via communication infrastructure 605. In certain embodiments, memory controller 620 may perform and/or be a means for performing, either alone or in combination with other elements, one or more of the operations or features described and/or illustrated herein.

I/O controller 635 generally represents any type or form of module capable of coordinating and/or controlling the input and output functions of a computing device. For example, in certain embodiments I/O controller 635 may control or facilitate transfer of data between one or more elements of computer system 225, such as processor 515, system memory 510, communication interface 640, display adapter 610, input interface 625, and storage interface 645.

Communication interface 640 broadly represents any type or form of communication device or adapter capable of facilitating communication between computer system 225 and one or more additional devices. For example, in certain embodiments communication interface 640 may facilitate communication between computer system 225 and a private or public network including additional computing systems. Examples of communication interface 640 include, without limitation, a wired network interface (such as a network interface card), a wireless network interface (such as a wireless network interface card), a modem, and any other suitable interface. In at least one embodiment, communication interface 640 may provide a direct connection to a remote server via a direct link to a network, such as the Internet. Communication interface 640 may also indirectly provide such a connection through, for example, a local area network (such as an Ethernet network), a personal area network, a telephone or cable network, a cellular telephone connection, a satellite data connection, or any other suitable connection.

In certain embodiments, communication interface 640 may also represent a host adapter configured to facilitate communication between computer system 225 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Serial Advanced Technology Attachment (SATA), Serial Attached SCSI (SAS), and external SATA (eSATA) host adapters, Advanced Technology Attachment (ATA) and Parallel ATA (PATA) host adapters, Fibre Channel interface adapters, Ethernet adapters, or the like.

Communication interface 640 may also allow computer system 225 to engage in distributed or remote computing. For example, communication interface 640 may receive instructions from a remote device or send instructions to a remote device for execution.

As illustrated in FIG. 6, computer system 225 may also include at least one display device 615 coupled to communication infrastructure 605 via a display adapter 610. Display device 615 generally represents any type or form of device capable of visually displaying information forwarded by display adapter 610. Similarly, display adapter 610 generally represents any type or form of device configured to forward graphics, text, and other data from communication infrastructure 605 (or from a frame buffer, as known in the art) for display on display device 615.

As illustrated in FIG. 6, computer system 225 may also include at least one input device 630 coupled to communication infrastructure 605 via an input interface 625. Input device 630 generally represents any type or form of input device capable of providing input, either computer or human generated, to computer system 225. Examples of input device 630 include, without limitation, a keyboard, a pointing device, a speech recognition device, or any other input device.

As illustrated in FIG. 6, computer system 225 may also include a storage volume 210 and an SSD cache 235 coupled to communication infrastructure 605 via a storage interface 645. Storage devices 210 and 235 generally represent any type or form of storage device or medium capable of storing data and/or other computer-readable instructions. For example, storage devices 210 and 235 may each include a magnetic disk drive (e.g., a so-called hard drive), a floppy disk drive, a magnetic tape drive, an optical disk drive, a flash drive, or the like. Storage interface 645 generally represents any type or form of interface or device for transferring data between storage devices 210 and 235 and other components of computer system 225. A storage device like storage volume 210 can store information such as block 205 (of data) of FIGS. 2A, 2B and 2C, as described above.

In certain embodiments, storage devices 210 and 235 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 210 and 235 may also include other similar structures or devices for allowing computer software, data, or other computer-readable instructions to be loaded into computer system 225. For example, storage devices 210 and 235 may be configured to read and write software, data, or other computer-readable information. Storage devices 210 and 235 may also be a part of computer system 225 or may be a separate device accessed through other interface systems.

Many other devices or subsystems may be connected to computer system 225. Conversely, all of the components and devices illustrated in FIG. 6 need not be present to practice the embodiments described and/or illustrated herein. The devices and subsystems referenced above may also be interconnected in different ways from that shown in FIG. 6.

Computer system 225 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computer system 225 for storage in memory via a network such as the Internet or upon a carrier medium.

The computer-readable medium containing the computer program may be loaded into computer system 225. All or a portion of the computer program stored on the computer-readable medium may then be stored in system memory 510 and/or various portions of storage devices 210 and 235.

When executed by processor 515, a computer program loaded into computer system 225 may cause processor 515 to perform and/or be a means for performing the functions of one or more of the embodiments described and/or illustrated herein. Additionally or alternatively, one or more of the embodiments described and/or illustrated herein may be implemented in firmware and/or hardware. For example, computer system 225 may be configured as an application specific integrated circuit (ASIC) adapted to implement one or more of the embodiments disclosed herein.

Figure 7:
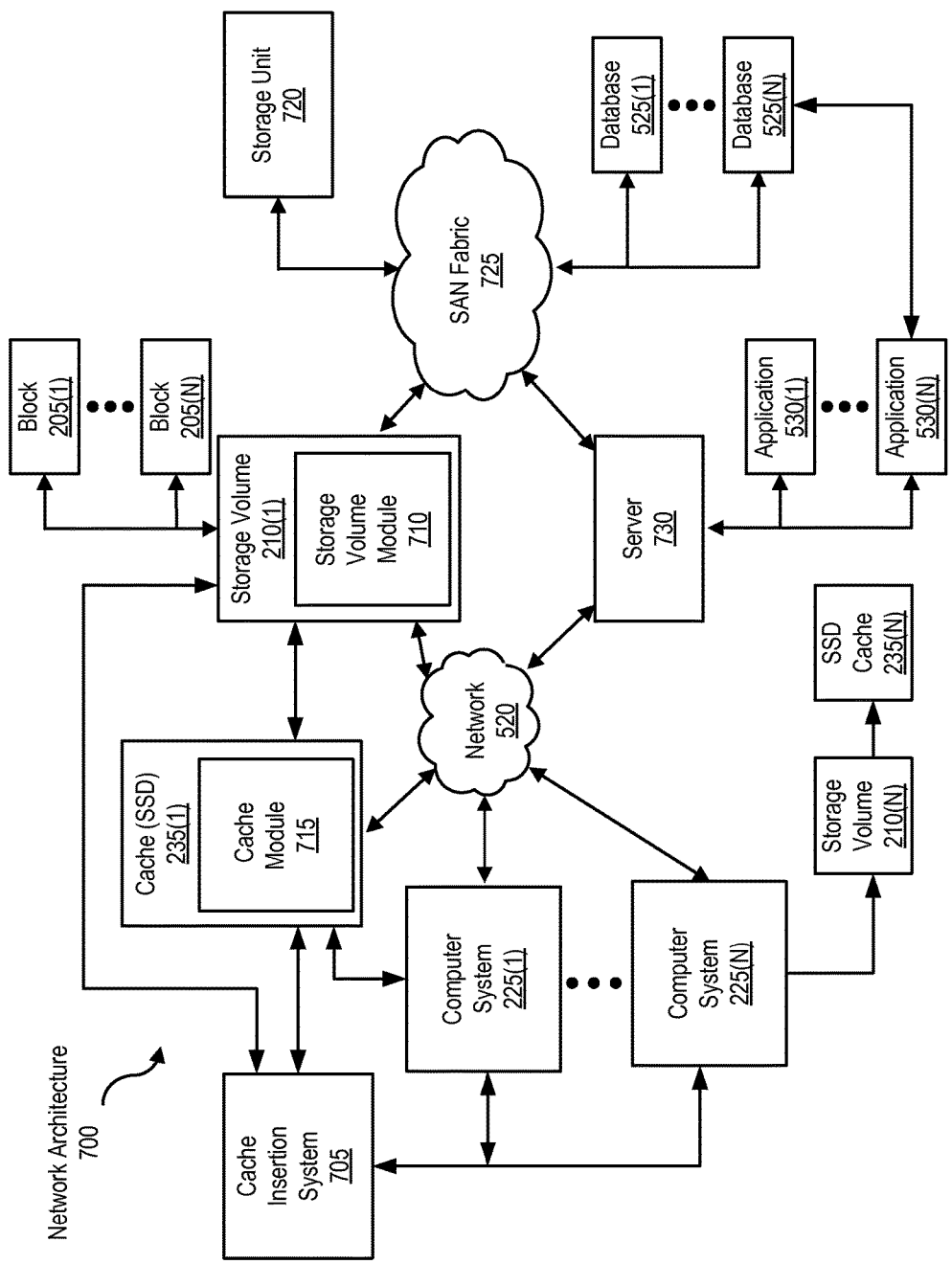
FIG. 7 is a block diagram of a networked system, illustrating how various computing devices and/or systems can communicate via a network, according to one embodiment of the present invention.

FIG. 7 is a block diagram of a network architecture 700 in which cache insertion system 705, computer systems 225(1)-(N), SSD cache 235 and storage volume 210 may be coupled to a network 520. Computer systems 225(1)-(N) generally represent any type or form of computing device or system, such as computer system 225 in FIG. 6.

Similarly, servers 730 generally represents a computing device or system, such as an application server or a database server, configured to provide various database services and/or run certain software applications. Network 520 generally represents any telecommunication or computer network including, for example, an intranet, a wide area network (WAN), a local area network (LAN), a personal area network (PAN), or the Internet. In one example, the cache insertion system 705 and computer systems 225(1)-(N) may include a cache insertion module 505 as shown in FIGS. 5A and 5B.

As illustrated in FIG. 7, a storage volume 210 may be directly attached to computer system 225. Similarly, one or more SSD caches 235(1)-(N) may be directly attached to computer systems 225(1)-(N). Storage unit 720 generally represents any type or form of storage device or medium capable of storing data and/or other computer-readable instructions. In certain embodiments, storage unit 720 may represent network-attached storage (NAS) devices configured to communicate with computer systems 225(1)-(N) using various protocols, such as Network File System (NFS), Server Message Block (SMB), or Common Internet File System (CIFS).

Server 730 may also be connected to a storage area network (SAN) fabric 725. SAN fabric 725 generally represents any type or form of computer network or architecture capable of facilitating communication between multiple storage devices. SAN fabric 725 may facilitate communication between server 730, database 525 and a plurality of storage devices. SAN fabric 725 may also facilitate, via network 520, communication between cache insertion system 705, storage volume 210 and SSD cache 235. As with storage unit 720, storage volume 210 and SSD cache 235 generally represent any type or form of storage device or medium capable of storing data and/or other computer-readable instructions.

In certain embodiments, and with reference to computer system 225 of FIG. 6, a communication interface, such as communication interface 640 in FIG. 6, may be used to provide connectivity between cache insertion system 705 and network 520. Cache insertion system 705 may be able to access information on databases 525(1)-(N) using, for example, a web browser or other client software. Such software may allow cache insertion system 705 to access data hosted by server 730, storage volume 210, or SSD cache 235. Although FIG. 7 depicts the use of a network (such as the Internet) for exchanging data, the embodiments described and/or illustrated herein are not limited to the Internet or any particular network-based environment.

In at least one embodiment, all or a portion of one or more of the embodiments disclosed herein may be encoded as a computer program and loaded onto and executed by server 730, database 525, computer system 225, storage volume 210, SSD cache 235, or any combination thereof. All or a portion of one or more of the embodiments disclosed herein may also be encoded as a computer program, stored in server 730, run by server 730, and distributed to cache insertion system 705 over network 520.

In some examples, all or a portion of the computing devices in FIGS. 2A, 2B, 2C, 5A, and 5B may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In addition, one or more of the components described herein may transform data, physical devices, and/or representations of physical devices from one form to another. For example, a cache insertion module 505 in FIGS. 5A and 5B may transform behavior of a computing device in order to cause the computing device to adjust a threshold access frequency of a based on a cache pressure.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
   counting a total number of blocks in a storage volume that have an access frequency matching or exceeding a threshold access frequency, wherein
      the access frequency is the number of times a block is accessed by a computer system during an interval of time, and
      the threshold access frequency is used to determine whether the block should be inserted into a cache from the storage volume;
   increasing the threshold access frequency if the total number of blocks exceed a number of blocks that can be stored in the cache; and
   decreasing the threshold access frequency if the total number of blocks is lower than the number of blocks that can be stored in the cache, wherein
      the increasing and the decreasing is based on a cache pressure of the cache prior to insertion of the block into the cache, and
      the cache pressure is determined based on a cache occupancy of the cache after the interval of time.

2. The method of claim 1, further comprising:
   decreasing the threshold access frequency if, after the interval of time, a number of blocks inserted into the cache from the total number of blocks in the storage volume that have the access frequency matching or exceeding the threshold access frequency is less than the number of blocks that can be stored in the cache.

3. The method of claim 1, further comprising:
   increasing the threshold access frequency if, after the interval of time, a number of blocks that can be inserted into the cache from the total number of blocks in the storage volume that have the access frequency matching or exceeding the threshold access frequency is greater than the number of blocks that can be stored in the cache.

4. The method of claim 1, further comprising:
   adjusting the threshold access frequency based on a cache pressure of the cache prior to permitting insertion of another block from the storage volume to the cache.

5. The method of claim 4, wherein
   determining the cache pressure of the cache comprises:
   calculating the access frequency of the blocks that should be inserted into the cache from the storage volume after the interval of time and the access frequency of one or more blocks existing in the cache after the interval of time, wherein
      the one or more blocks existed prior to the insertion of the blocks from the storage volume into the cache during the interval of time; and
   calculating the cache occupancy of the cache after the interval of time, comprising
      counting the number of blocks in the cache that do not match or exceed the threshold access frequency after the interval of time, and
      counting the number of blocks in the cache that match or exceed the threshold access frequency after the interval of time.

6. The method of claim 5, wherein
   determining whether the cache pressure is high comprises at least one of
      identifying that the number of blocks that should be inserted into the cache is greater than the number of blocks that can be stored in the cache, or
      identifying that after the interval of time, the access frequency of one or more blocks existing in or inserted into the cache is lower than the threshold access frequency.

7. The method of claim 6, wherein
   the determination of whether the cache pressure is high indicates that the cache is being over-utilized, and
   upon the indication that the cache is being over-utilized, increasing the threshold access frequency prior to permitting insertion of the another block from the storage volume to the cache.

8. The method of claim 5, wherein
   determining whether the cache pressure is low comprises at least one of
      identifying that the number of blocks that should be inserted into the cache is lower than the number of blocks that can be stored in the cache, or
      identifying that after the interval of time, the access frequency of one or more blocks existing in or inserted into the cache is higher than the threshold access frequency.

9. The method of claim 8, wherein
   the determination of whether the cache pressure is low indicates that the cache is being under-utilized, and
   upon the indication that the cache is being under-utilized, decreasing the threshold access frequency prior to permitting insertion of the another block from the storage volume to the cache.

10. A non-transitory computer readable storage medium comprising program instructions executable to:
   count a total number of blocks in a storage volume that have an access frequency matching or exceeding a threshold access frequency, wherein
      the access frequency is the number of times a block is accessed by a computer system during an interval of time, and the threshold access frequency is used to determine whether the block should be inserted into a cache from the storage volume;

increase the threshold access frequency if the total number of blocks exceed a number of blocks that can be stored in the cache; and decrease the threshold access frequency if the total number of blocks is lower than the number of blocks that can be stored in the cache, wherein the increasing and the decreasing is based on a cache pressure of the cache prior to insertion of the block into the cache, and the cache pressure is determined based on a cache occupancy of the cache after the interval of time.

11. The non-transitory computer readable storage medium of claim 10, further comprising:

decreasing the threshold access frequency if, after the interval of time, a number of blocks inserted into the cache from the total number of blocks in the storage volume that have the access frequency matching or exceeding the threshold access frequency is less than the number of blocks that can be stored in the cache; and increasing the threshold access frequency if, after the interval of time, a number of blocks that can be inserted into the cache from the total number of blocks in the storage volume that have the access frequency matching or exceeding the threshold access frequency is greater than the number of blocks that can be stored in the cache.

12. The non-transitory computer readable storage medium of claim 10, comprising adjusting the threshold access frequency based on a cache pressure of the cache prior to permitting insertion of another block from the storage volume to the cache.

13. The non-transitory computer readable storage medium of claim 12, wherein determining the cache pressure of the cache comprises:

calculating the access frequency of the blocks that should be inserted into the cache from the storage volume after the interval of time and the access frequency of one or more blocks existing in the cache after the interval of time, wherein the one or more blocks existed prior to the insertion of the blocks from the storage volume into the cache during the interval of time; and calculating the cache occupancy of the cache after the interval of time, comprising counting the number of blocks in the cache that do not match or exceed the threshold access frequency after the interval of time, and counting the number of blocks in the cache that match or exceed the threshold access frequency after the interval of time.

14. The non-transitory computer readable storage medium of claim 13, wherein determining whether the cache pressure is high comprises at least one of identifying that the number of blocks that should be inserted into the cache is greater than the number of blocks that can be stored in the cache, or identifying that after the interval of time, the access frequency of one or more blocks existing in or inserted into the cache is lower than the threshold access frequency, and determining whether the cache pressure is low comprises at least one of identifying that the number of blocks that should be inserted into the cache is lower than the number of blocks that can be stored in the cache, or identifying that after the interval of time, the access frequency of one or more blocks existing in or inserted into the cache is higher than the threshold access frequency.

15. The non-transitory computer readable storage medium of claim 14, wherein the determination of whether the cache pressure is high indicates that the cache is being over-utilized, and upon the indication that the cache is being over-utilized, increasing the threshold access frequency prior to permitting insertion of the another block from the storage volume to the cache, and the determination of whether the cache pressure is low indicates that the cache is being under-utilized, and upon the indication that the cache is being under-utilized, decreasing the threshold access frequency prior to permitting insertion of the another block from the storage volume to the cache.

16. A system comprising:

one or more processors; and a memory coupled to the one or more processors, wherein the memory stores program instructions executable by the one or more processors to:

count a total number of blocks in a storage volume that have an access frequency matching or exceeding a threshold access frequency, wherein the access frequency is the number of times a block is accessed by a computer system during an interval of time, and the threshold access frequency is used to determine whether the block should be inserted into a cache from the storage volume;

increase the threshold access frequency if the total number of blocks exceed a number of blocks that can be stored in the cache; and decrease the threshold access frequency if the total number of blocks is lower than the number of blocks that can be stored in the cache, wherein the increasing and the decreasing is based on a cache pressure of the cache prior to insertion of the block into the cache, and the cache pressure is determined based on a cache occupancy of the cache after the interval of time.

17. The system of claim 16, further comprising:

decreasing the threshold access frequency if, after the interval of time, a number of blocks inserted into the cache from the total number of blocks in the storage volume that have the access frequency matching or exceeding the threshold access frequency is less than the number of blocks that can be stored in the cache; and increasing the threshold access frequency if, after the interval of time, a number of blocks that can be inserted into the cache from the total number of blocks in the storage volume that have the access frequency matching or exceeding the threshold access frequency is greater than the number of blocks that can be stored in the cache.

18. The system of claim 16, comprising adjusting the threshold access frequency based on a cache pressure of the cache prior to permitting insertion of another block from the storage volume to the cache.

19. The system of claim 18, wherein determining the cache pressure of the cache comprises:

calculating the access frequency of the blocks that should be inserted into the cache from the storage volume after the interval of time and the access frequency of one or more blocks existing in the cache after the interval of time, wherein
  the one or more blocks existed prior to the insertion of the blocks from the storage volume into the cache during the interval of time; and
calculating the cache occupancy of the cache after the interval of time, comprising
  counting the number of blocks in the cache that do not match or exceed the threshold access frequency after the interval of time, and
  counting the number of blocks in the cache that match or exceed the threshold access frequency after the interval of time.

20. The system of claim 19, wherein
determining whether the cache pressure is high comprises at least one of
  identifying that the number of blocks that should be inserted into the cache is greater than the number of blocks that can be stored in the cache, or
  identifying that after the interval of time, the access frequency of one or more blocks existing in or inserted into the cache is lower than the threshold access frequency,
the determination of whether the cache pressure is high indicates that the cache is being over-utilized, and upon the indication that the cache is being over-utilized, increasing the threshold access frequency prior to permitting insertion of the another block from the storage volume to the cache,
determining whether the cache pressure is low comprises at least one of
  identifying that the number of blocks that should be inserted into the cache is lower than the number of blocks that can be stored in the cache, or
  identifying that after the interval of time, the access frequency of one or more blocks existing in or inserted into the cache is higher than the threshold access frequency, and
the determination of whether the cache pressure is low indicates that the cache is being under-utilized, and upon the indication that the cache is being under-utilized, decreasing the threshold access frequency prior to permitting insertion of the another block from the storage volume to the cache.

21. The method of claim 1, further comprising:
maintaining the threshold access frequency if the total number of blocks matches the number of blocks that can be stored in the cache.

\* \* \* \* \*